United States Patent [19]
Olson

[11] 3,947,804
[45] Mar. 30, 1976

[54] RANGE-BEARING COMPUTER
[75] Inventor: Charles W. Olson, Huntington Station, N.Y.
[73] Assignee: The United States of America as represented by the Secretary of the Navy, Washington, D.C.
[22] Filed: Apr. 11, 1963
[21] Appl. No.: 272,495

[52] U.S. Cl. .............................. 340/6 R; 343/112 C
[51] Int. Cl.² .......................................... G01S 3/80
[58] Field of Search.. 343/11, 112 R, 112 C, 112 D; 340/6 R, 16 R; 235/186, 187, 190

[56] References Cited
UNITED STATES PATENTS
2,400,552    5/1946    Hoover, Jr. ............................. 340/6

Primary Examiner—Richard A. Farley

EXEMPLARY CLAIM
1. In an electro-mechanical bearing computer in which the bearing angle of a target relative to a predetermined line is computed from the time interval between the arrivals of a wave front at two spaced locations and a constant voltage proportional to the distance of separation of the spaced locations, the velocity of propagation of the wave front, and the angle of inclination formed by the intersection of a line drawn through the spaced locations and a horizontal plane through one of the spaced locations,
  a. means for generating a first signal proportional to said time interval,
  b. means for generating a second signal proportional to said constant voltage,
  c. first resolving means connected to said first and second signal generating means for providing an unmodified third signal equal to the difference between said first and second signals,
  d. third signal detecting means connected to said resolving means for providing an error signal when said third signal is not a predetermined value and for providing a null signal when said third signal is said predetermined value,
  e. means connected to said resolving means for modifying said third signal and providing an indication of the bearing angle relative to said target and a predetermined line,
  f. means connected to said third signal detecting means and said modifying-indicating means for mechanically controlling said signal modifying-indicating means in response to said null and error signals.

7 Claims, 6 Drawing Figures

INVENTOR.
CHARLES W. OLSON

RANGE-BEARING COMPUTER

The present invention relates to a special purpose computer for solving trigonometric equations and more particularly to an electro-mechanical, analogue computer to solve two trigonometric equations which are indicative of the bearing and range of a target.

Those concerned with the development of target position computers have long recognized the need for stabilization of the various components incorporated in the servo systems of such computers. The present invention fulfills this need.

The general purpose of this invention is to provide a target position computer which embraces all the advantages of similarly employed range and bearing computers but which does not possess the aforedescribed disadvantage of instability. To attain this, the present invention contemplates a unique feedback loop built into the servo system providing the desired stabilization. The feedback which is derived from the output of the servo system is utilized to vary the gain of an active element in the servo system so that the sensitivity of the active element is substantially constant over a wide range of input values.

An object of the present invention is the provision of a new and improved target position computer which determines both the range and bearing of a target by solving two trigonometric equations.

Another object is to provide a range-bearing computer having a new and novel feedback arrangement which is used to stabilize a servo loop of the computer.

A further object of the invention is the provision of a new and improved electro-mechanical analogue computer to solve two trigonometric equations.

Still another object is to provide a range-bearing computer which computes the range and bearing of a target from known input data and controls the firing system of a ballistic missile.

Other objects and many of the attendant advantages of this invention will be readily appreciated as the same becomes better understood by reference to the following description when considered in connection with the accompanying drawings in which like reference numbers designate like parts throughout the figures thereof and wherein.

Figure 1:
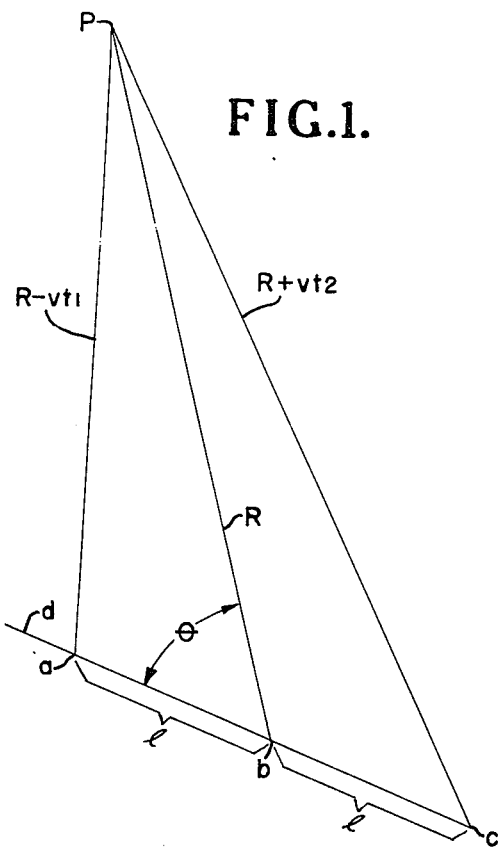
FIG. 1 shows the geometry of the range-bearing problem to be solved as a general proposition.

Referring now to the drawings, wherein like reference characters designate like or corresponding parts throughout the several views, there is shown in FIG. 1 the geometry of the general problem to be solved. A radiating source of acoustical signals such as those which emanate from a ship or submarine is shown located at position P. Positions $a$, $b$ and $c$, designate locations of three stations where acoustical signaling sensing devices, such as hydrophones, may be attached along the axis $d$ of a submarine, or the like. The hydrophones $a$ and $c$ are shown to be equidistantly spaced from hydrophone $b$ by a distance $l$. Assuming that position $b$ is the origin from which a ballistic missile is to be fired, then the range from the missile launcher to the target is defined by the straight line R. In like manner the bearing angle $\theta$ is defined as the angle formed by the intersection of the range line R and the axis $d$ of the submarine. Since the propagation velocity $v$ of water is substantially constant at any given time, an acoustical signal emanating from point P will arrive at the three positions $a$, $b$, and $c$ delayed by measurable periods of time. From the measurement of the relative times of arrival of a given acoustical signal at the positions $a$, $b$, $c$, the range R and bearing $\theta$ to the target P may be determined in the following manner:

Assume
$v$ = velocity of propagation
$t_1$ = delay in arrival time between location $a$ and location $b$
$t_2$ = delay in arrival time between location $b$ and location $c$
R = range from $b$ to $P$
$\theta$ = bearing of $P$ relative to the axis $d$
$l$ = distance between the receivers $(t_2 - t_1) = \Delta t$ The solution to the problem may be obtained by using the cosine law, which defines the third side of a triangle when two sides and the inclined angle are given. In general form this is represented by:

$$x^2 = y^2 + z^2 - 2yz \cos \theta$$

where $\theta$ is the angle included by the sides $y$ and $z$; or, $$2yz \cos \theta = y^2 + z^2 - x^2 \qquad (1)$$

Referring to the upper triangle in FIG. 1 which has vertices P, $a$ and $b$ it may be seen that the distance from point P to location $a$ is $(R - v\,t_1)$ and the substitution in the above equation (1) has the following result:

$$2lR \cos \theta = l^2 + R^2 - (R - vt_1)^2 ;$$

or $$2lR \cos\theta = l^2 + 2Rvt_1 - v^2 t_1^2 \qquad (2)$$

In like manner from the lower bottom triangle in FIG. 1 which has vertices $P$, $b$ and $c$ the following equation may be derived:

$$- 2lR \cos\theta = l^2 - 2Rvt_2 - v^2 t_2^2 \qquad (3)$$

Adding (2) and (3) yields:

$$0 = 2l^2 + 2Rv(t_1 - t_2) - v^2(t_1^2 + t_2^2) \qquad (4)$$

Solving (4) for the range, R:

$$R = \frac{v^2(t_1^2 + t_2^2)}{-2v\Delta t} + \frac{l^2}{v\Delta t} \qquad (5)$$

From equation (2) above, it follows that:

$$\cos \theta = \frac{vt_1}{l} - \frac{l}{2R} \quad \frac{v^2 t_1^2}{l^2} - 1$$

Since $R$, the range, in most instances is very much larger than $l$, which is approximately ½ of the length of a submarine, it follows:

$$\cos \theta \cong \frac{vt_1}{l} \qquad (6)$$

Referring to equation (5) and assuming that $t_1$ is approximately equal to $t_2$ as it will be within the capabilities of the present art measuring devices, and substituting $\cos \theta$ from equation (6), the range $R$ may be rewritten as:

$$R = -\frac{l^2}{v \Delta t}(\cos^2\theta - 1) \text{ ; or}$$

$$R = \frac{l^2 \sin^2\theta}{v \Delta t}$$

Thus it may be seen from the above derivation that the bearing $\theta$ and the range $R$ may be represented in terms of known quantities as follows:

$$\theta = \cos^{-1} \frac{vt_1}{l} \qquad (7)$$

$$R = \frac{l^2 \sin^2\theta}{v \Delta t} \qquad (8)$$

Because of the design of the modern submarine it is not practical to position acoustical signal sensing devices, such as hydrophones, exactly and precisely as shown in FIG. 1 along the axis $d$ of the submarine. Instead, in practice it is usually found necessary to position the center hydrophone as shown at position $b$ to one side or the other of the axis $d$ and it is also often necessary to move the hydrophone along the axis $d$ in one direction or the other. Should this be the case, the derivation of the range $R$ and bearing $\theta$, as derived from the simple case set forth in FIG. 1, is obviously incorrect. To compensate for misaligned positioning of the central hydrophone, the range and bearing equations must be modified in such a manner so as to bring position $b$ back into alignment. Explanation of the mathematics involved to bring about the proper modification of the range and bearing equations is set forth with reference to FIG. 2 and FIG. 3. Explanation of the mathematics involved for modification of the range and bearing equations where the submarine is diving or ascending is set forth with reference to FIG. 4.

Figure 2:
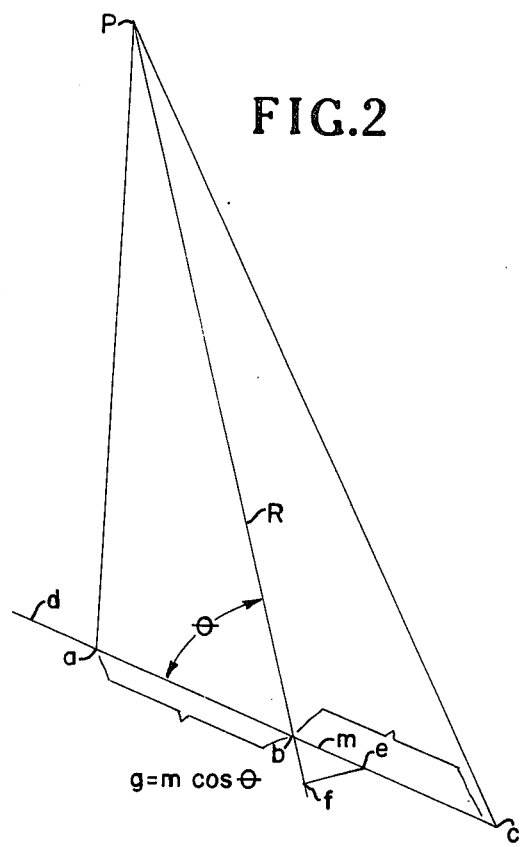
FIG. 2 shows the geometry of a specific problem to be solved where the range and bearing must be modified because of misalignment of one sensing device along the axis formed by a plurality of sensing devices.

In FIG. 2 the condition is shown wherein the hydrophone is actually attached to the submarine at positon $e$ rather than position $i$. The position $e$ must be mathematically moved back to position $b$ in order that the general solution of the range and bearing still prevails.

This is accomplished by assuming that an arc, having as its origin the point $P$, when drawn through position $e$ would result in substantially a straight line which intersects the extension of the range line $R$ at position $f$. The distance that the range line R is extended is denoted by $g$. Therefore: $g = m \cos \theta$, where $m$ is the distance that the hydrophone is actually displaced along the axis from the theoretically ideal position $b$.

The time necessary for the acoustic signal to travel this distance $g$ is the time by which the general range equation must be modified. This modifying time may be represented:

$$t_3 = \frac{m \cos\theta}{v}, \text{ but since } \cos\theta \cong \frac{vt_1}{l \pm m}$$

$$t_3 = \pm \frac{m}{l \pm m} t_1 \qquad (9)$$

Figure 3:
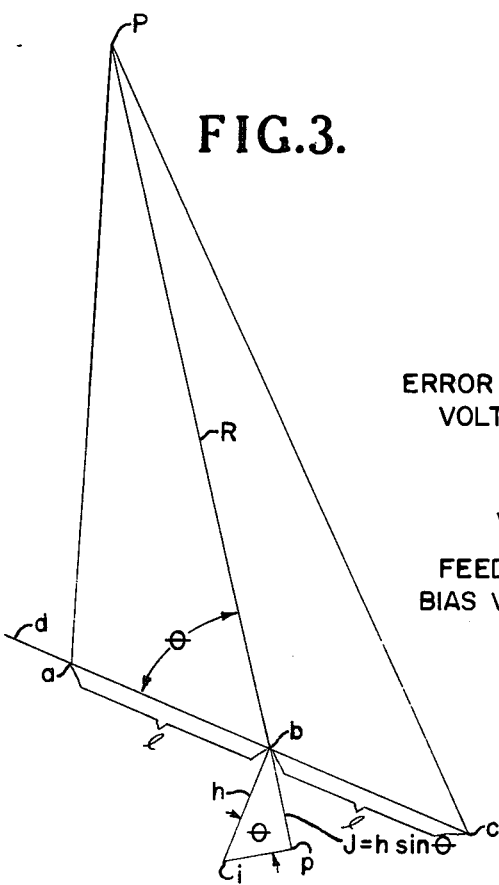
FIG. 3 shows the geometry of a problem similar to that shown in FIG. 2 but where misalignment occurs because the sensing devices are not all positioned in a straight line.

On FIG. 3 is shown the condition where the actual positioning of the hydrophone is some perpendicularly measured distance $h$ at position $i$ from the ideal axis $d$. If an arc which has its radius at point $P$ is drawn through the position $i$ of the hydrophone in the manner described in reference to FIG. 2, the distance traveled by the acoustical signal must be modified by the distance $j$, or correspondingly the time traveled must be likewise modified. Since the distance $j$ equals $h \sin \theta$, the corresponding time modification $t_4$ will be:

$$t_4 = \pm \frac{h \sin\theta}{v} \qquad (10)$$

Modification necessary to adapt the generalized range equation (8) so as to return the hydrophone to the ideal location $b$ is given below:

$l^2$ must be replaced by $(l+m)(l-m)$ and, $\Delta t$ must be modified by $t_3$ and $t_4$;
(equations (9) and (10) above.)

The final range equation by substitution then becomes:

$$R = \frac{(l+m)(l-m)\sin^2\theta}{v(\Delta t \pm t_3 \pm t_4)} \text{ or}$$

$$R = \frac{(l+m)(l-m)\sin^2\theta}{v\left(\Delta t \pm \frac{m}{l \pm m} t_1 \pm \frac{h \sin\theta}{v}\right)} \qquad (11)$$

Figure 4:
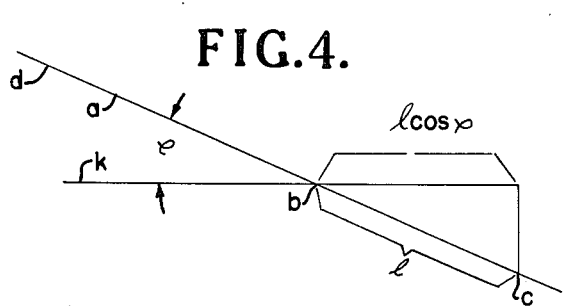
FIG. 4 shows the geometry of a problem which necessitates compensation because the axis of the sensing devices forms an angle with a horizontal plane projected through one of the sensing devices.

Referring to FIG. 4 where the axis of the submarine is shown as being inclined to a horizontal plane $k$ by some angle $\alpha$, it may be seen that the projection of the line representing the distance between locations $b$ and $c$ is $l \cos \alpha$ along the horizontal line $k$. Modification of $l$ in the general range and bearing equations is also necessary where as discussed above the axis of the hydrophones $d$ is not level but inclined at some angle $\alpha$ with respect to a horizontal plane $k$. Making all the modifications of the general range and bearing equations results in the following equations which must be solved by the electro-mechanical analogue computer:

$$\theta = \cos^{-1} \frac{vt_1}{l\cos\alpha} \qquad (12)$$

$$R = \frac{K_1 \sin^2\theta}{v\left(\Delta t \pm \frac{\Gamma}{l} t_1 \pm K_2 \sin \theta\right)} \qquad (13)$$

where
$\alpha$ = the angle that the hydrophone axis $d$ makes by the intersection with a horizontal plane $K$;
$K_1$ = a constant related to the hydrophone misalignment along the axis $d$;

$\Gamma/l$ = a constant related to the displacement of the hydrophone along the axis at some distance, $m$, from the ideal location $b$;

$K_2$ = a constant related to the amount the hydrophone ideally located at position $b$ is misaligned on one side or the other of the hydrophone axis $d$.

Figure 5:
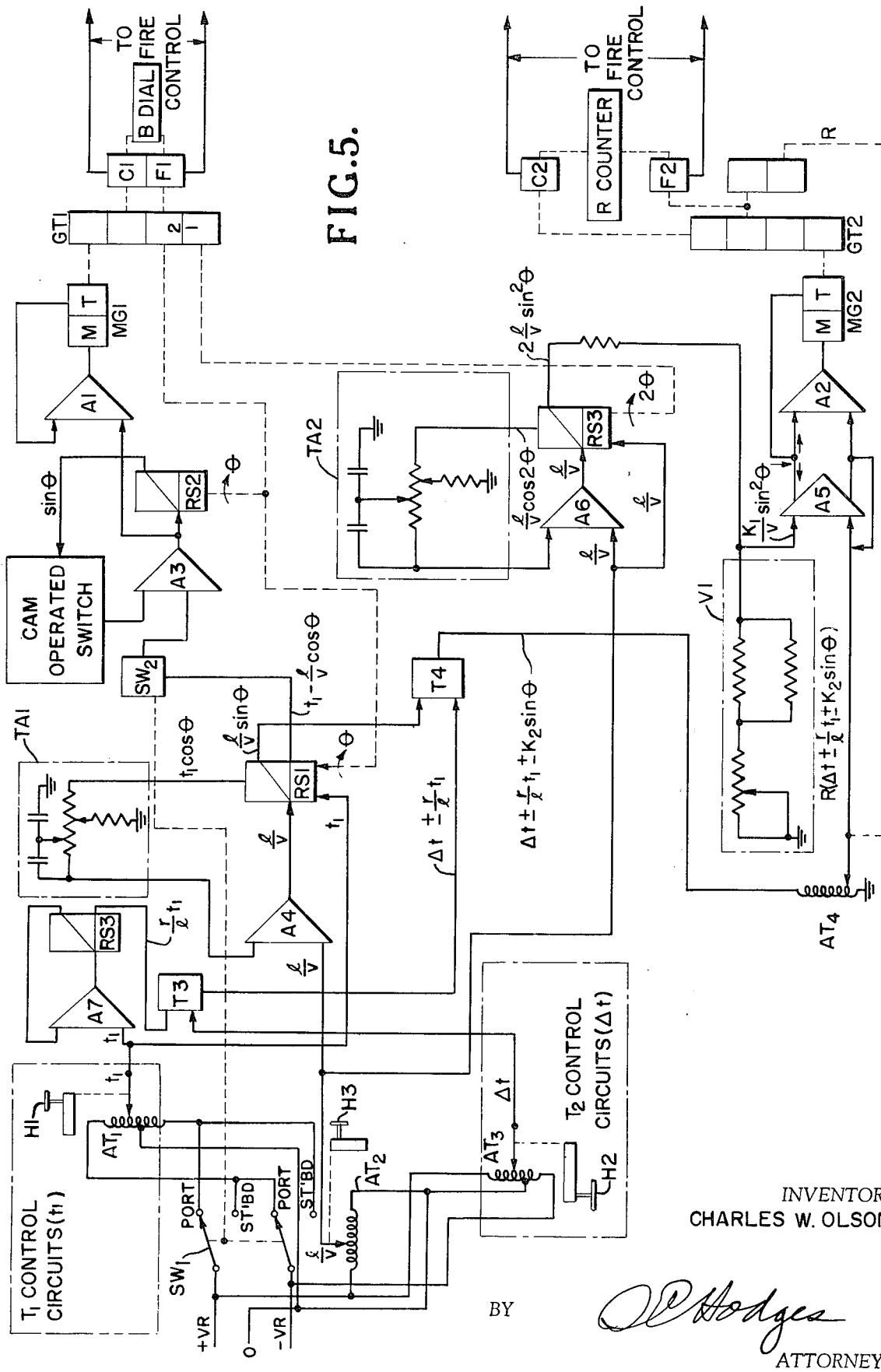
FIG. 5 is a diagram illustrative of a computer for solving the problems set forth in FIGS. 2, 3 and 4.

Having mathematically derived the equations which provide the solution for the bearing and range, it may be seen that the bearing equation can be solved independently by circuitry illustrated in FIG. 5, while the range equation is dependent upon the bearing solution. This being the case, the analogue computer must first compute the bearing from the given input data and then supply this bearing as an input to the range solution circuitry.

Referring to FIG. 5 there is shown essentially a block diagram form of the invention. The invention is shown in this form to aid in the simplicity of description of essential elements of this invention. A detail explanation of each and every component such as the resolvers, amplifiers, and gear trains, of this invention is considered unnecessary since many well known circuits and mechanical devices may be employed in the invention to perform the necessary operations as set forth in the block diagrams and the descriptions.

In FIG. 5, VR refers to the 400-cycle reference voltage which undergoes a substantial filtering process (not shown) before being supplied to the input of the computer. This reference voltage is supplied to the three autotransformers $AT_1$, $AT_2$, $AT_3$ and the switch $SW_1$. Switch $SW_1$ is mechanically ganged to the switch $SW_2$, a port-starboard switch that the computer operator throws either to the port or starboard position depending on the target position as indicated on the radar or sonar display tube. This multiple-throw switch allows the computer to solve the bearing $\theta$ on either the port or starboard side of the submarine by interjecting the proper sign ($\pm$) values to the input signals. The $T_1$ control circuit and $T_2$ control circuit shown in FIG. 5 provide the inputs $t_1$ and $\Delta T$, respectively. The autotransformers are energized by the reference voltages VR and voltages proportional to $t_1$ and $\Delta t$ are obtained at autotransformers $AT_1$ and $AT_3$ by the adjustment of the operator's hand cranks H1 and H2 in such a manner that these inputs are matched to the target spikes displayed on the cathode-ray-tube of the target detection circuitry (not shown).

A third input to the computer circuitry is derived from the autotransformer $AT_2$. This input is provided by the operator's adjustment of hand crank H3 such that a voltage $l/v$, which is a function of the hydrophone spacing $l$ divided by the velocity $v$ of sound in the water, is applied from autotransformer $AT_2$ to the isolation amplifier A4. The voltage signal $l/v$ is amplified by isolation amplifier A4 and supplied as an input to resolver RS1. The shaft of resolver RS1 is mechanically coupled to the bearing gear train $GT_1$ which at any given time will rotate the shaft to the position corresponding to the derived bearing angle. A third input to the resolver RS1 is $t_1$, which is derived from autotransformer $AT_1$, as described heretofore. The compensating winding of resolver RS1 feeds back a voltage $t_1 \cos \theta$ through a trim network TA1. This feedback loop compensates for the phase and amplitude variations of the resolver-amplifier combination. A voltage $l/v \cos \theta$, which is derived from the inputs to the resolver RS1 is subtracted from the input $t_1$ to provide a second output voltage ($t_1 - l/v \cos \theta$). This voltage is applied to the second target position switch $SW_2$ for determining the target position, port or starboard.

It should be understood at this point that if the hydrophone axis $d$ is inclined at some angle $\alpha$ to a horizontal plane as shown in FIG. 4, then the voltage supplied by the autotransformer $AT_2$ will be $l/v \cos \Gamma$ instead of merely $l/v$. Therefore the voltage appearing as an input to the variable gain amplifier A3 will be either of the following:

$t_1 - l/v \cos \theta$; or ps
$t_1 - l/v \cos \theta \cos \alpha$.

In either event, when the bearing equation is solved this input voltage applied to the variable gain amplifier A3 must be zero. Therefore, the variable gain amplifier A3 is a comparator which compares the voltage $t_1$ with either voltage $l/v \cos \theta$, or $l/v \cos \theta \cos \alpha$. If $t_1$ is unequal to the voltage with which it is compared, the input to amplier A3 will be some value other than zero or some predetermined reference voltage. An error voltage proportional to the difference between the voltage $t_1$ and the voltage to which it is compared is generated at the output of amplifier A3 and supplied to resolver RS2 and synchro-servo-amplifier A1.

Synchro-servo-amplifier A1 further amplifies the error voltage and drives motor-tachometer MG1. The motor is mechanically linked to the bearing gear train GT1 which guides the shaft of resolvers RS2 and RS1 to the proper bearing position. The tachometer feeds back a signal to synchro-servo-amplifier in order to stabilize the operation of the amplifier A1 and motor-tachometer MG1. Resolver RS2 feeds back a voltage proportional to the sine of the bearing angle $\theta$ to the variable gain amplifier A3. This voltage is fed back through a cam operated switch which reverses the polarity or sign of the feedback at 0° and 180° respectively so that it will always be a positive feedback. By feeding back $K_3 \sin\theta$ to bias the variable gain amplifier A3, the gain is varied in such a manner that large surges of input voltages which are a function of $\cos \theta$ are prevented from causing oscillation and instability of the bearing servo circuitry.

Figure 6:
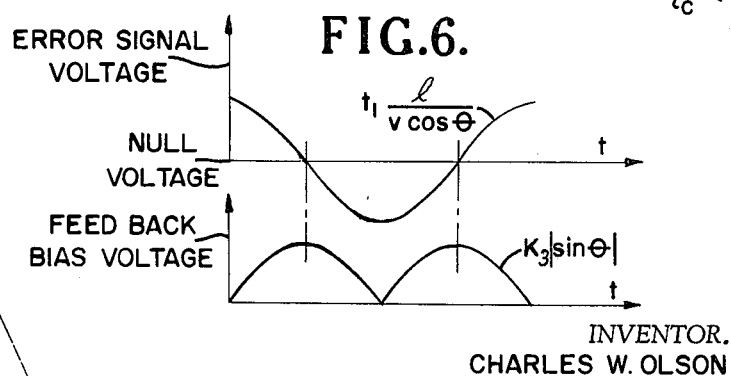
FIG. 6 is a graph representing the feedback bias and error signal inputs to an amplifier in the bearing servo circuitry.

Referring to FIG. 6 it may be seen that when $K_3 \sin\theta$ is a maximum, the input cosine voltage is minimum, as an absolute value. Therefore, the error signal generated will not be unduly amplified, and overdriving of gear-train GT1 is prevented. On the other hand, when the cosine input voltage is maximum in absolute value, indicating a relative large error voltage and necessitating a large correction of bearing train GT1, the feedback voltage $K_3 \sin \theta$ will be minimum thus allowing a greater degree of compensation to occur via the bearing servo circuitry.

The bearing gear train GT1 is mechanically coupled to a course gear train C1 and a fine gear train F1. The course and fine gearing trains control the course and fine synchros which drive the firing system. When the gearing train GT1 drives the bearing shaft of resolver RS1 to the proper position, $t_1$ will equal the voltage to which it is compared, and a null signal will appear at the input of the amplifier indicating that the bearing equation is solved.

Turning now to the range solving circuitry which is also shown in FIG. 5, the voltage $t_1$ is supplied to an amplifier-resolver network A7-RS3 where the time modifying voltage $(\Gamma/l)t_1$, is generated. This voltage is supplied to a transformer T3 where it is added to the voltage Δt supplied by autotransformer $AT_3$. The output of transformer T3 is a voltage $\Delta t \pm (\Gamma/l)t_1$ which is supplied as an input to transformer T4 where it is added to the voltage $(l/v) \sin \theta$ derived from the resolver RS1 of the bearing solution circuitry. The output of transformer T4 is $\Delta t \pm (\Gamma/l)t_1 \pm K_2 \sin \theta$ which is supplied to autotransformer AT4 where it is multiplied by the range R. One of the inputs to the variable gain amplifier A5 is therefore the product R $(\Delta t \pm (\Gamma/l)t_1 \pm K_2 \sin \theta)$.

An isolation amplifier A6 amplifies the input voltage $(l/v)$ provided by autotransformer $AT_2$ and supplies the amplified signal as an input to resolver RS3. The resolver RS3 is also provided with an input which is the product $2\theta$ and is derived from the bearing gear train GT1. One of the outputs of the resolver is fed back through the trim adjustment network TA2 to provide stabilization for the amplifier-resolver circuit while the other output is the product $2(l/v)\sin^2 \theta$. The resolver RS3 actually provides the voltage $(l/v) - (l/v) \cos 2\theta$ but this can be reduced by trigonmetric identities to $(l/v)(1 - \cos 2\theta)$ which in turn is reducible to the voltage $2(l/v) \sin^2 \theta$. Voltage divider V1 multiplies the output of the resolver RS3 thereby introducing the constant $(K_1/v)$ and providing the second input to comparing amplifier A5.

When the signal $(K_1/v) \sin^2 \theta$ is unequal to $R\Delta t \pm (\Gamma/l)t_2 \pm K_2 \sin \theta)$, the difference provides an error signal which is amplified and fed to solution servo-amplifier A2. The output of solution servo-amplifier A2 drives motor-tachometer MG2 which mechanically drives the range gear train GT2. The tachometer output of MG2 is fed back to solution servo-amplifier A2 to insure proper dampening of the motor tachometer servo loop and is also heavily fed back to variable gain amplifier A5 to reduce amplifier gain variations. This feedback system assures that the range counter will be driven at a relatively low speed and reduces the possibility of mechanical damage due to surges of mechanical power.

When the signal voltages appearing at the input of amplifier A5 are equal in amplitude, a null is produced and the range equation is solved.

The range gear train GT2 is mechanically coupled to course gear train C2 and fine gear train F2 which transmit the range data to the firing system servos. A bearing dial and a range counter are mechanically coupled to the gear trains C1-F1 and C2-F2, respectively, so that a visual indication of the bearing and range is available and can be utilized by the computer operator.

The operation of the range-bearing analogue computer may be briefly summarized as follows: Input signals representing known conditions are supplied to the bearing solution circuitry where a mathematically derived comparison of the known and the unknown (i.e., the bearing $\theta$) is made. The result of this comparison is used to vary the unknown condition until a null signal is produced by such comparison. In this manner the bearing $\theta$ is derived by the bearing solution circuitry. Once the bearing $\theta$ has been determined, a similar technique for determining the range is employed by the range solving circuitry. The bearing $\theta$ is used as one of the known conditions in the range solution circuitry because the range is a dependent function.

It should be understood, of course, that the foregoing disclosure relates to only a preferred embodiment of the invention and that numerous modifications or alterations may be made without departing from the spirit and the scope of the invention as set forth in the appended claims.

What is claimed is:

1. In an electro-mechanical bearing computer in which the bearing angle of a target relative to a predetermined line is computed from the time interval between the arrivals of a wave front at two spaced locations and a constant voltage proportional to the distance of separation of the spaced locations, the velocity of propagation of the wave front, and the angle of inclination formed by the intersection of a line drawn through the spaced locations and a horizontal plane through one of the spaced locations,
   a. means for generating a first signal proportional to said time interval,
   b. means for generating a second signal proportional to said constant voltage,
   c. first resolving means connected to said first and second signal generating means for providing an unmodified third signal equal to the difference between said first and second signals,
   d. third signal detecting means connected to said resolving means for providing an error signal when said third signal is not a predetermined value and for providing a null signal when said third signal is said predetermined value,
   e. means connected to said resolving means for modifying said third signal and providing an indication of the bearing angle relative to said target and a predetermined line,
   f. means connected to said third signal detecting means and said modifying-indicating means for mechanically controlling said signal modifying-indicating means in response to said null and error signals.

2. The combination defined in claim 1 characterized further by the addition thereto of
   a. sine generating means connected to said third signal detecting means and said signal modifying-indicating means for continuously providing a stabilizing feedback signal to said third signal detecting means.

3. The combination defined in claim 2 characterized further by the addition thereto of,
   a. switching means connected to said sine generating means and said detecting means for maintaining a positive polarity feedback signal.

4. In an electro-mechanical range and bearing computer in which the bearing angle, relative to a target and a predetermined line and range of the target are computed from arrival times of a wave front at three spaced sensing devices and a constant voltage proportional to the distance between the sensing devices, the velocity of propagation of the wave front, and an angle of inclination formed by the intersection of a line drawn through said spaced locations and a horizontal plane passed through one of said spaced locations,
   a. means for generating a first signal proportional to a first time interval corresponding to the difference between the time of arrival of a wave front at a first sensing device and a second sensing device,
   b. means for generating a second signal proportional to a second time interval corresponding to the difference between said first time interval and a third time interval which is the difference between the time of arrival of a wave front at said second sensing device and a third sensing device, c. means for generating a third signal proportional to said constant voltage,
d. means connected to said first and third signal generating means for computing the bearing angle relative to a target and a predetermined line,
e. means connected to said bearing angle computing means for indicating the bearing angle,
f. means connected to said bearing angle computing means and said second signal generating means for computing the range of said target, and
g. means connected to said range computing means for indicating the range of the target.

5. In an electro-mechanical range and bearing computer in which the bearing angle relative to a target and a predetermined line and the range of the target are computed from arrival times of a wave front from the target and received at three spaced sensing devices and a constant voltage proportional to the distance between said sensing devices, the velocity of propagation of the wave front, and the angle of inclination formed by the intersection of a line drawn through the spaced devices and a horizontal plane passed through one of said spaced devices,
a. means for generating a first signal proportional to a first time interval which is the difference between the time of arrival of the wave front at a first sensing device and a second sensing device,
b. means for generating a second signal proportional to a second time interval which is the difference between said first time interval and a third time interval which is the difference between the time of arrival of the wave front at said second sensing device and a third sensing device,
c. means for generating a third signal proportional to said constant voltage,
d. first resolving means connected to said first and third generating means for providing an unmodified fourth signal equal to the difference between said first and third signals,
e. first detecting means connected to said resolving means for selectively providing a first error signal when said fourth signal is not a predetermined value and a first null signal when said fourth signal is said predetermined value,
f. first indicating means connected to said resolving means for modifying said fourth signal and providing an indication of the bearing angle of the target,
g. first drive means connected to said first detecting means and said first indicating means for mechanically controlling said indicating means in response to said first null and error signals,
h. second resolving means connected to said third generating means and said first indicating means for providing a fifth signal proportional to said third signal and the bearing angle,
i. second detecting means coupled to said second generating means and said second resolving means for selectively providing a second error signal when said fifth signal is not equal to said second signal and a second null signal when said fifth signal is equal to said second signal,
j. second indicating means connected to said second detecting means for modifying said second signal and providing an indication of the range of the target,
k. second drive means connected to said second detecting means and said second indicating means for mechanically controlling said second indicating means in response to said second null and error signals.

6. The combination defined in claim 5 characterized further by the addition thereto of;
a. sine generating means connected to said first detecting means and said first indicating means for providing a stabilizing feedback signal to said first detecting means.

7. The combination defined in claim 6 characterized further by the addition thereto of,
a. switching means connected to said sine generating means and said first detecting means for maintaining a positive polarity feedback signal.

* * * * *